United States Patent [19]

Saito et al.

[11] Patent Number: 4,808,897
[45] Date of Patent: Feb. 28, 1989

[54] APPARATUS FOR CONTROLLING A SEAT FOR VEHICLES

[75] Inventors: Masatsugu Saito, Yamato; Chikamasa Ikeda; Seiei Takeda, both of Yokohama, all of Japan

[73] Assignees: Ikeda Bussan Co., Ltd.; Niles Parts Co., Ltd., both of Japan

[21] Appl. No.: 836,523

[22] Filed: Mar. 5, 1986

[51] Int. Cl.⁴ .............................................. G05B 19/42
[52] U.S. Cl. ..................................... 318/568; 318/466; 297/330
[58] Field of Search ............... 318/466, 467, 603, 568; 307/9, 10 R, 10 SP; 340/52 F; 296/65 R; 297/330

[56] References Cited

U.S. PATENT DOCUMENTS

| | | | |
|---|---|---|---|
| 2,890,299 | 6/1959 | Adams et al. | 296/65 R |
| 4,128,797 | 12/1978 | Murata | 318/568 X |
| 4,204,255 | 5/1980 | Cremer | 364/425 |
| 4,211,967 | 7/1980 | Akiyama et al. | 318/490 |
| 4,264,849 | 4/1981 | Fleischer et al. | 318/568 |
| 4,401,928 | 8/1983 | Kamijo et al. | 318/466 |
| 4,404,632 | 9/1983 | Harada et al. | 364/425 |
| 4,434,468 | 2/1984 | Caddick et al. | 318/466 X |
| 4,467,252 | 8/1984 | Takeda et al. | 318/568 X |
| 4,468,596 | 8/1984 | Kinzl et al. | 318/468 |
| 4,523,136 | 6/1985 | Dudeck et al. | 318/568 |
| 4,698,571 | 10/1987 | Mizuta et al. | 318/568 |

Primary Examiner—William M. Shoop, Jr.
Assistant Examiner—David Martin
Attorney, Agent, or Firm—Ronald P. Kananen

[57] ABSTRACT

An apparatus for controlling a seat of vehicles comprising mode selecting means for cyclically switching the control modes with respect to the position and the posture of said seat, a displaying section for displaying said control mode in accordance with the output from said mode selecting means, a selecting switch connected to the input of said mode selecting means for switching said control mode, an increasing/decreasing switch for controlling the amount of control with respect to the posture of said seat, and a control section for controlling the vehicle's seat in accordance with the output signal from said mode selecting switch and the switching signal from said increasing/decreasing switch, wherein the number of switches may be reduced thereby reducing the space for providing the switches and making simple the switching operation.

10 Claims, 2 Drawing Sheets

APPARATUS FOR CONTROLLING A SEAT FOR VEHICLES

BACKGROUND OF THE INVENTION

1. Field of the Invention

The present invention relates to an apparatus for controlling a seat for vehicles. More particularly, this invention relates to an apparatus for controlling a seat for vehicles which is capable of effecting many controls for the seat with a few switches.

2. Description of the Prior Art

Hitherto, there has been known as an apparatus of this kind an apparatus for controlling the posture of a seat for a user suitably by adjusting the inner pressure of the air bags mounted at plural positions within the seat by using an air pump. Such apparatus is disclosed in publications such as Japanese Patent Unexamined Publication No. 58-53524.

According to the conventional apparatus as mentioned above, however, it is undesirably necessary to provide many switches, the number of which is the same as that of switches for controlling the inner pressure of many bags, which results in a complex constitution of switch and complex operation for the switches.

SUMMARY OF THE INVENTION

An object of the present invention is to provide an apparatus for controlling a seat for vehicles comprising mode selecting means for cyclically selecting the position of the vehicle's seat and the control mode for support portions, displaying means for displaying the control modes in accordance with the output from the mode selecting means, selecting switches connected to the inputs of the mode selecting means for selecting the control modes, an increasing/decreasing switch for changing the control amount for the vehicle's seat, and control section for controlling the vehicle's seat in accordance with the outputs from the mode selecting means and the increasing/decreasing switch.

It is the feature of the present invention that the control mode is cyclically changed or selected for each operation of the selecting switches, the control modes being displayed by means of the displaying means, and the vehicle's seat being controlled by a predetermined amount in the selected control mode displayed by the displaying means in cooperation with the mode selecting means when the increasing/decreasing switch is operated.

DESCRIPTION OF THE PREFERRED EMBODIMENTS

A preferred embodiment of the present invention is explained hereinafter on the basis of the accompanying drawings.

Figure 1:
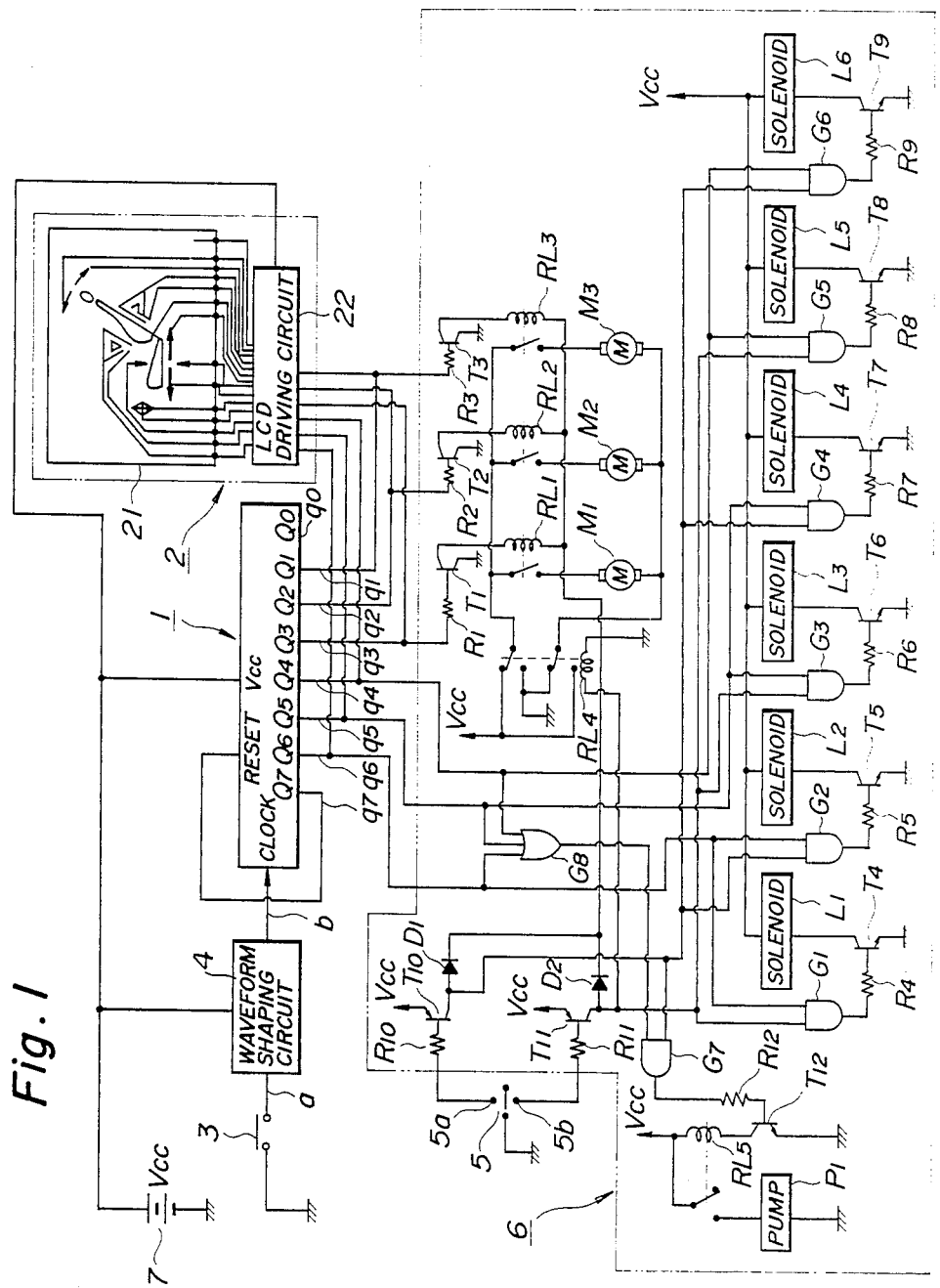
FIG. 1 is a view showing an electric circuit of a preferred embodiment of the present invention.

Referring to FIG. 1, numeral 1 denotes a counter as mode selecting means and so-called Jonson Counter. Numeral 2 denotes a displaying section composed of a liquid crystal display 21 (referred to simply as LCD) and a LCD driving circuit 22, numeral 3 denotes a selecting switch for switching the control mode; 4, a waveform shaping circuit disposed between the counter 1 and the selecting switch 3; 5, an increasing/decreasing switch for controlling the air pressure in air bags disposed at the support portions and the position of the vehicle's seat; and 6, a control section for controlling the vehicle's seat in cooperation with the mode selecting means when the increasing/decreasing switch is operated.

Specifically, the control section 6 has first and a second solenoids L1 and L2 for controlling the valve of the air bags mounted within the runner supports for the vehicle's seat, third and a fourth solenoids L3 and L4 for runner supports, fifth and sixth solenoids L5 and L6 for the runner supports, and an air pump P1 for increasing the air pressure in the air bags at the runner supports. Furthermore, M1 denotes a first motor for reversibly adjusting the angle of the reclining portion; M2, a second motor for vertically adjusting the position of the seat; M3, a third motor for horizontally adjusting the position of the seat; RL1 to RL3, first to third relays for switching the current circuit of the first to the third motors; RL4, a fourth relay for switching the current polarity of the motors M1 to M3; and RL5, a fifth relay for switching the current circuit of the pump P1.

Furthermore, G1 to G7 denote first to seventh AND circuits; G8, an OR circuit; T1 to T12, transistors; D1 and D2, diodes for avoiding the reversal current; R1 to R12, resistors; and 7, a battery for the vehicle.

Figure 2:
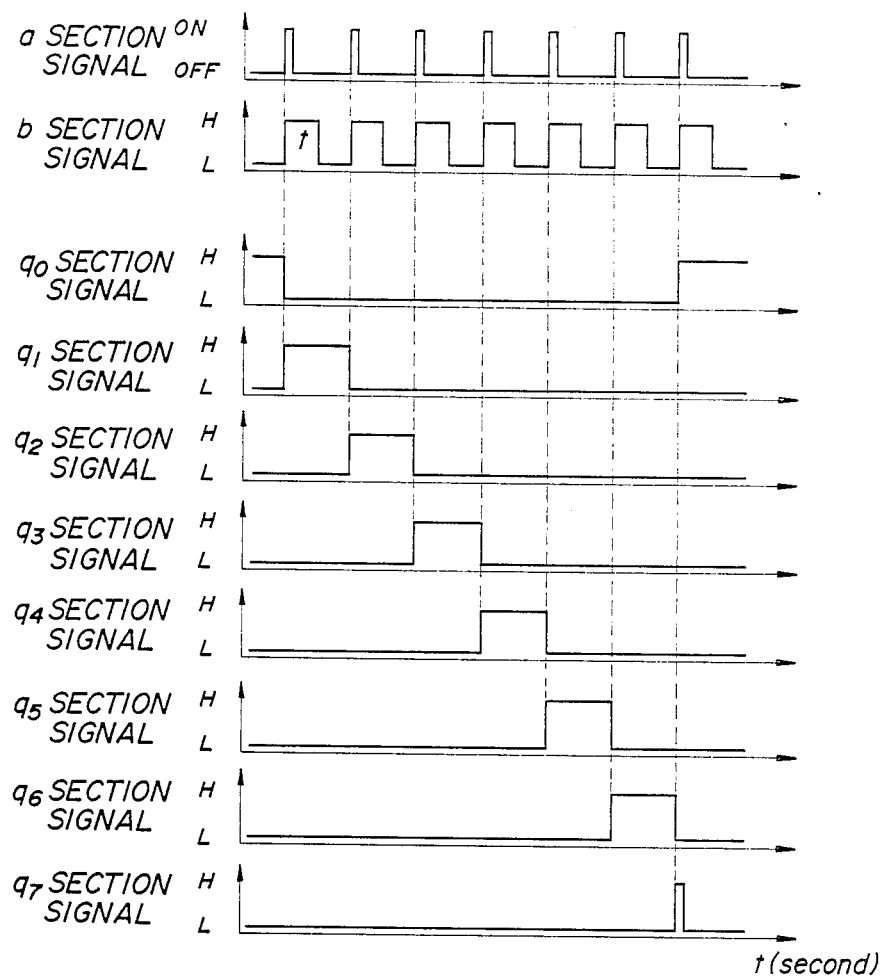
FIG. 2 is a view showing the waveforms of electric signals at several sections in the electric circuit of FIG. 1.

Referring to FIG. 2, an operation of the preferred embodiment of FIG. 1 will be described.

For example, if a driver sits down at the seat, the selection switch 3 is operated to obtain a suitable driving position in accordance with a physique and a demand of the driver, and the signal a in FIG. 2 is input into the input section of the counter 1 through the waveform shaping circuit 4 for each one operation of the selection switch 3.

When the selection switch 3 is not yet operated, the section q0 of the counter 1 is in an "H" level and the sections q1 to q7 are in an "L" level; therefore no signal for displaying the control mode is output to the LCD 21.

Next, if the selection switch 3 is operated once, the high level signal "H" is shifted from the Q0 section to the q1 section of the counter 1; therefore, the signal for displaying the control mode of controlling the vehicle's seat in the horizontal direction is applied to the LCD 21, and the transistor T3 is activated thereby actuating the third motor M3 for adjusting the seat in the horizontal direction. The high level signal "H" is sequentially shifted from the section q2 to the sections q7 and q0 cyclically for each operation of the selection switch 3; therefore, the control mode of the control section 6 which is to be displayed in the LCD 21 is sequentially and cyclically shifted from the control mode for adjusting the seat vertically, the control mode for adjusting the angle of the reclining portion, the control mode for controlling the inner pressure in the air bags for the side support portions, and the control stop mode, in accordance with the shifting operation of the high level signal "H" at the input section of the counter 1.

For example, when the third motor M3 for adjusting the seat horizontally is set in the actuatable condition, if the increasing/decreasing switch 5 is operated to contact with the first fixed contact 5a or the second fixed contact 5b, the third relay RL3 is energized and the third motor M3 is applied with a current, thereby adjusting the vehicle's seat in the horizontal direction. As mentioned above, the increasing/decreasing switch 5 can be operated in another control mode similarly to the above-mentioned control mode, and the control mode displayed on the displaying section 6 is effected by the control section 6.

Namely, according to the embodiment of the present invention, the control modes of six kinds are cyclically switched by sequentially operating the selection switch 3, and further the amount of control in the selected control mode is controlled by operating the increasing-/decreasing switch 5, and further the selected control mode is displayed on the displaying section 2.

As mentioned above, according to the present invention the control mode output from the mode selection means is cyclically switched for each operation of the selection switch, the control mode is displayed on the displaying section, and the amount of the selected control mode is controlled by operating the increasing/decreasing switch. Therefore, the present invention has advantages such that the number of switches may be reduced thereby reducing the space for providing the switches and making simple the switching operation.

What is claimed is:

1. An apparatus for controlling a plurality of position and posture control modes of a seat of a vehicle comprising:
    mode selecting means for automatically cyclically switching, upon command, to one of a plurality of control modes for said seat with respect to the position and the posture of said seat;
    a displaying section for displaying a selected one of said control modes in accordance with the output from said mode selecting means;
    a selecting switch connected to the input of said mode selecting means for initiating cyclical switching of said selected one of said control modes;
    an increasing/decreasing switch for providing a control signal for controlling the amount of control on said selected control mode with respect to the position and posture of said seat, said increasing-/decreasing switch being operative for each selected control mode; and
    a control section responsive to said increasing/decreasing switch for controlling the position and posture of vehicle's seat in accordance with the output signal from said mode selecting switch and the control signal from said increasing/decreasing switch.

2. An apparatus for controlling a seat for vehicles according to claim 1, wherein said mode selecting switch is composed of a Jonson Counter.

3. An apparatus for controlling a seat for vehicles according to claim 1, wherein said displaying section is composed of a liquid crystal display and a LCD driving circuit.

4. An apparatus for controlling a seat for vehicles according to claim 1, wherein said control section is composed of an electric motor, an electromagnetic solenoid and switching elements.

5. The apparatus as set forth in claim 1, wherein said seat includes means disposed at predetermined portions and positions of said seat for adjusting selected parameters of said seat such as the vertical adjustment of said seat, the angle of a reclining portion of said seat, and a position for side support portions for said seat, said increasing/decreasing switch controlling a predetermined one of said control modes in response to the control mode selected by said mode selecting means.

6. The apparatus as set forth in claim 1, wherein said mode selecting means include an initial state representative of the absence of a driver at said seat of said vehicle, said displaying section displaying no control mode for such initial condition.

7. The apparatus as set forth in claim 1, wherein said mode selecting means includes a counter for respectively controlling an output signal for displaying the control mode and for controlling the seat of the vehicle through various selective modes.

8. An apparatus for controlling a plurality of control modes for a seat of a vehicle of the type which includes means for controlling support portions of said seat and positioning of said seat, comprising:
    mode selecting means, including a counter, for sequentially selecting a different mode each time said counter is actuated in response to a mode selecting signal with respect to the position and the posture of said seat and outputting a control mode signal representative thereof;
    a mode selecting switch in circuit with said mode selecting means for providing said mode selecting signal for switching the control mode output by said mode selecting means;
    display means responsive to said control mode signal for displaying the control mode exhibited by said mode selecting means;
    an increasing/decreasing switch in circuit with said support portion and position control means in said seat and operative to control each of said means for controlling support portions and positions in each control mode; and
    means for controlling the seat of said vehicle in response to said mode selecting means when said increasing/decreasing switch is operated, whereby a plurality of position and posture characteristics for said seat may be individually controlled by said increasing/decreasing switch depending on the cyclically-selected state of the mode selecting means.

9. The apparatus as set forth in claim 8, wherein said control means includes a plurality of solenoids for controlling a plurality of air bags for adjusting posture parameters mounted within said seat and a pump for increasing air pressure in the air bags, and cooperating with a plurality of motors for adjusting position parameters of said seat including the angle of its reclining portion, its vertical adjustment, and its horizontal adjustment.

10. An apparatus for controlling a seat of a vehicle, comprising:
    a seat having a plurality of air bags disposed at support portions for said seat and respectively actuated by a like plurality of air bag switches, said seat being mounted so that a reclining position, a vertical position, and a horizontal position of said seat are adjustable in response to actuation of motor means to any one of a plurality of adjustment positions through respective adjustment modes;
    a mode selection switch;
    mode selecting means responsive to said mode selection switch and including a sequential counter for sequentially controlling one of said adjustment modes for said seat, said adjustment modes for said seat being cyclically changed in said mode selecting means for actuation of said mode selection switch;

displaying means responsive to said mode selecting means for displaying the mode as switched of said mode selecting means;

an increasing/decreasing switch for increasingly or decreasingly controlling posture and position of said seat depending upon the selected control mode; and control means for controlling said seat in cooperation with the mode selecting means when the increasing/decreasing switch is operated by operatively connecting said increasing/decreasing switch to one of air bag switches and said motors depending on the control mode selected.

* * * * *

UNITED STATES PATENT AND TRADEMARK OFFICE
CERTIFICATE OF CORRECTION

PATENT NO. : 4,808,897

DATED : February 28, 1989

INVENTOR(S) : Masatsugu Saito, Chikamasa Ikeda, and Seiei Takeoka

It is certified that error appears in the above-identified patent and that said Letters Patent is hereby corrected as shown below:

On the face of the patent, the name of the third-named inventor should read -- Seiei Takeoka --.

Signed and Sealed this

First Day of August, 1989

Attest:

DONALD J. QUIGG

Attesting Officer

Commissioner of Patents and Trademarks